(12) United States Patent
DeSchrijver

(10) Patent No.: US 6,311,042 B1
(45) Date of Patent: Oct. 30, 2001

(54) APPARATUS AND METHODS FOR IMAGING WRITTEN INFORMATION WITH A MOBILE TELEPHONE SET

(76) Inventor: Stefaan DeSchrijver, 952 Beacon St, Newton, MA (US) 02159

( * ) Notice: Subject to any disclaimer, the term of this patent is extended or adjusted under 35 U.S.C. 154(b) by 0 days.

(21) Appl. No.: 09/344,723

(22) Filed: Jun. 25, 1999

Related U.S. Application Data

(60) Provisional application No. 60/090,933, filed on Jun. 27, 1998.

(51) Int. Cl.$^7$ ...................................................... H09B 1/38
(52) U.S. Cl. ............................................. 455/66; 455/556
(58) Field of Search ............................ 455/66, 556, 557, 455/956, 457, 566, 575, 145, 151.2, 154.2, 158.4, 158.5; 345/133, 179, 180; 380/247, 276; 178/18.01, 19.01

(56) References Cited

U.S. PATENT DOCUMENTS

| 5,485,505 | 1/1996 | Norman et al. | 379/58 |
| 5,548,092 | 8/1996 | Schriver | 178/18 |
| 5,561,446 | * 10/1996 | Montlick | 345/173 |
| 5,745,116 | * 4/1998 | Pisutha-Arnond | 345/358 |
| 5,769,643 | * 6/1998 | Stevens, III | 434/350 |
| 5,844,548 | * 12/1998 | Chen et al. | 345/179 |
| 6,085,098 | * 7/2000 | Moon et al. | 455/457 |

FOREIGN PATENT DOCUMENTS

| 0718 750 A1 | 6/1996 | (EP) . |
| WO 97/05731 | 2/1997 | (WO) . |
| WO 98/16911 | 4/1998 | (WO) . |
| WO 98/18251 | 4/1998 | (WO) . |

* cited by examiner

Primary Examiner—William Trost
Assistant Examiner—Congvan Tran
(74) Attorney, Agent, or Firm—Ropes & Gray

(57) ABSTRACT

The systems and methods described herein provide communication systems that allow for the transmission of voice and data over a wireless network. To that end, the systems described herein include a mobile wireless communication system, such as a GSM telephone, and a pen input device capable of collecting information about an image written on a writing surface and capable of transmitting that information into the wireless communication device.

13 Claims, 5 Drawing Sheets

APPARATUS AND METHODS FOR IMAGING WRITTEN INFORMATION WITH A MOBILE TELEPHONE SET

REFERENCE TO RELATED APPLICATIONS

This application claims priority to U.S. Provisional Patent Application No. 60/090,933 entitled Apparatus and Methods for Imaging Written Information With A Mobile Telephone Set, by Stefaan DeSchrijver, and filed Jun. 27, 1998, the contents of which are hereby incorporated by reference.

FIELD OF THE INVENTION

The invention relates to telephony systems, facsimile systems, and computer imaging systems. In particular the invention relates to pen computing devices, and imaging of written documents.

BACKGROUND OF THE INVENTION

Today, the proliferation of wireless communication devices has provided the marketplace with powerful tools for communicating in real time. For example, the GSM wireless phone is quickly becoming a world standard for telecommunications. In fact, in many areas of the world, the GSM phone is replacing land-line systems as the standard platform for voice communications.

However, although such systems are well suited for providing customers with mobile systems for voice communications, as of today, such systems are poorly suited for delivering data over a wireless network. The systems that currently do exist for allowing the transmission of data over a network from a mobile system typically involve coupling the GSM, or other type of mobile phone, into an assembly of devices that can include a laptop computer, a cellular modem, and a GSM phone. With these elements coupled together a user can generate documents, faxes, e-mail messages, and other such media communications on the laptop computer system and then employ the wireless channel provided by the cellular modem and GSM phone to deliver the data across the wireless network. Although such systems can work well in certain applications, they are generally quite bulky, expensive, and involve too much overhead to be practical for transmissions of brief and quick data communications.

Accordingly, there is a need in the art for a communication system that is well suited for allowing a mobile customer to transmit voice and data traffic over a wireless network.

SUMMARY OF THE INVENTION

The systems and methods of the invention enable the integration of a pen computer input device into a mobile phone.

The systems and methods described herein provide communication systems that allow for the transmission of voice and data over a wireless network. To that end, the systems described herein include a mobile wireless communication system, such as a GSM telephone, and a pen input device capable of collecting information about an image written on a writing surface and capable of transmitting that information into the wireless communication device. In one embodiment, the systems described herein include a GSM phone that has included therein a receiver unit capable of communicating with a pen input device. The pen input device can be a stylus that includes a plurality of sensor mechanisms which can measure forces being applied to a nib of the stylus. The pen input device can further include a transmitter that is capable of transmitting to the GSM the signals collected by the pen as the pen moves across a writing surface. Optionally, the transmitter can be a secure transmitter having a processor for encrypting and decrypting information transmitted over a radio cellular network. In one embodiment, the GSM phone includes a processor that can operate the receiver to collect the data signals transmitted by the pen input device. The processor can further format the collected data information according to a preselected data transmission format and transmit the data across a wireless network to a desired location.

In one particular practice, the systems described herein cooperate with a server at a remote location that can receive and process the data signals transmitted by the wireless communication device. In one such embodiment, the server can be equipped to compare data signals transmitted from the wireless device against templates of data signals stored at the server site, or stored at a location accessible by the server. The server can compare the data signals transmitted from the wireless communication device against the template information and determine a measure of similarity between the template and the transmitted data signals. Accordingly, in one practice, the systems described therein provide a system that allows for verifying the identity of a user at a remote location by having the user sign a document at the remote location with the pen input device.

The pen input device can capture information representative of the dynamic characteristics of the user's signature as well as information representative of the image of the user's signature. This information can be transferred from the pen to the wireless communication device, formatted for delivery over the wireless network, and transmitted to the remote server. At the remote server, the data can be analyzed, such as by dynamic time warping, or other known methods, and compared to information stored within the database, allowing a verification analysis to be performed.

In response to a successful verification of the user's identity, the system can provide a verification signal to a selected location. The verification signal can be employed for allowing the user to verify their identity for any suitable application, such as for authorizing a financial transaction such as making a purchase with a credit card, making a transfer of funds from one bank to another, becoming legally bound to a contractual obligation, or for any other suitable application.

In other applications, the data signals transmitted to the remote server can be processed to generate an image of what the user wrote on to the writing surface. The image can be delivered as part of an e-mail message, or as part of a white board application communication, or any other suitable application. Optionally, the image data can be analyzed by a character recognition process to generate a text version of the written information.

BRIEF DESCRIPTION OF THE ILLUSTRATED EMBODIMENTS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

The invention will now be described with reference to certain illustrated embodiments. However, it will be understood by those of ordinary skill in the art that the systems and methods described herein can be realized as a plurality of different types of devices each suitable for transferring data and voice information over a network, such as a wireless network. Moreover, it will be understood that the systems and methods described herein can be modified by those of ordinary skill in the art, such as for example, by including additional elements for increasing the functionality of the systems described herein, as well as by modifying certain of the disclosed elements for altering or adapting the operation of the systems described herein to be more suited for another application. Accordingly, it will be understood that the systems and methods described herein are merely illustrative of the types of systems and methods that can be realized by the present invention, and the following embodiments are not be deemed as limiting the invention in any way.

Figure 1:
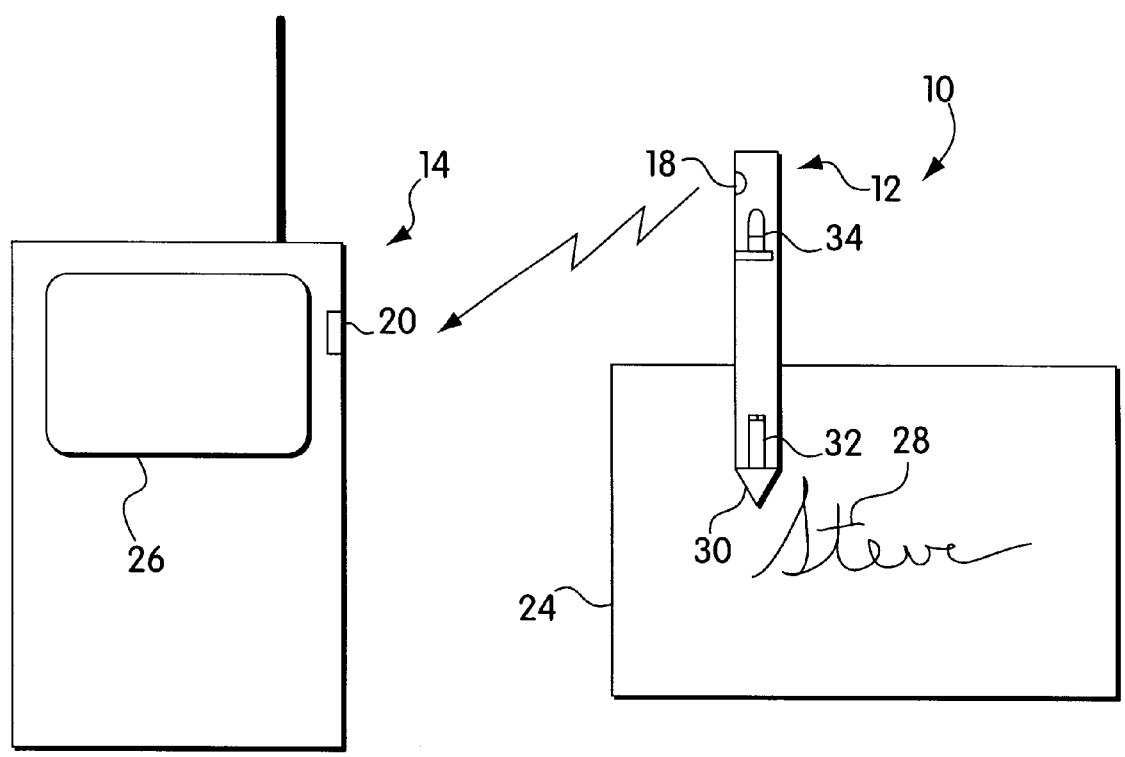
FIG. 1 depicts a functional block diagram of one system according to the invention for allowing the user to transmit voice and data over a wireless network.

Turning now to FIG. 1, one embodiment of a system according to the invention can be seen. The system 10 depicted in FIG. 1 is a communications system that allows a user to transfer data and voice communications across a wireless network. For the embodiment depicted in FIG. 1, the system 10 includes a pen input device and a wireless communication device. The pen input device can be employed as a data input system that can deliver data to the wireless communication device 14. The wireless communication device 14, in one embodiment, can act as a platform that is capable of formatting data communications provided by the pen input device into a format suitable for transmission across the wireless network. Accordingly, the pen input device and wireless communication device cooperate to provide a system that allows a user to communicate voice and data signals.

The term "voice communications" as that term is employed herein will be understood to encompass the exchange of voice signals between two endpoints on a communication network. For example, voice communications will be understood to include the transmission of voice signals across a network as well as the transmission of audible tones that can comprise a facsimile transmission, or modem transmission, or other type of voice-type transmissions. The term "data communications" as employed herein will be understood to encompass the transmission of data, typically represented as modulated digital signals that can be communicated across a data network, typically in a format other than that employed for voice communications. For example, it will be understood that data communications, unlike voice communications, are readily formatted into a series of packets that can be transmitted from one endpoint, sent out across a network, and collected and reassembled at a remote endpoint.

More specifically, FIG. 1 depicts a system 10 that includes a pen input device 12 and a wireless communication device 14. The pen input device 12 includes a transmitter element 18, a nib 30, a movement/force sensor 32 and an angular sensor 34. The pen input device 12 depicted in FIG. 1 is disposed above a writing surface 24 wherein an image 28, shown in FIG. 1 as a signature, is traced. The wireless communication device 14 depicted in FIG. 1 includes a receiver 20 capable of receiving data signals transmitted from the transmitter 18 of the pen input device 12.

The depicted pen input device 12 can be an imaging device that includes an ink pen cartridge and sensors mounted along the longitudinal axis of the cartridge. The sensors can measure lateral forces that deflect the pen cartridge, typically the nib 30. The sensors can also optionally measure the force of which the nib is being pressed against the writing surface 24. The sensors can generate signals representative of the forces applied to the nib 30 as the pen moves along or presses against the writing surface 24. In the depicted embodiment, a further sensor 34 is employed to determine the angle at which the pen input device 12 is held relative to the writing surface 24. For the depicted pen input device 12, as the pen input device 12 moves across the writing surface 24, the sensors 32 and 34 generate data signals which are representative of the dynamics of the pen motion which occurs while the pen input device is being employed for tracing an image, such as the depicted signature 28, on the surface 24. The data signals are representative of the dynamics of the pen motion as well as the form of the image 28 traced onto the surface 24. In the embodiment depicted in FIG. 1, the data signals generated by the sensors can be transmitted by the transmitter 18 to the wireless communication device 14. One pen input device suitable for practice with the present invention is the pen input device described in U.S. Pat. No. 5,548,092, entitled "Apparatus and Method for Imaging Written Information" and assigned to the Assignee hereof.

The wireless communication device 14 depicted in FIG. 1 is shown as a mobile telephone, such as a GSM telephone, of the type commonly employed for voice communications. Although the wireless communication device 14 will be described herein as a GSM device, the systems and methods described herein are applicable to any digital cellular radio system, including the European digital mobile telephone system GSM and corresponding digital systems, such as DCS1800 and PCN (Personal Communication Network). As shown in FIG. 1, the telephone 14 has been modified to include a receiver 20 that can receive data signals generated by the pen input device 12.

Figure 2:
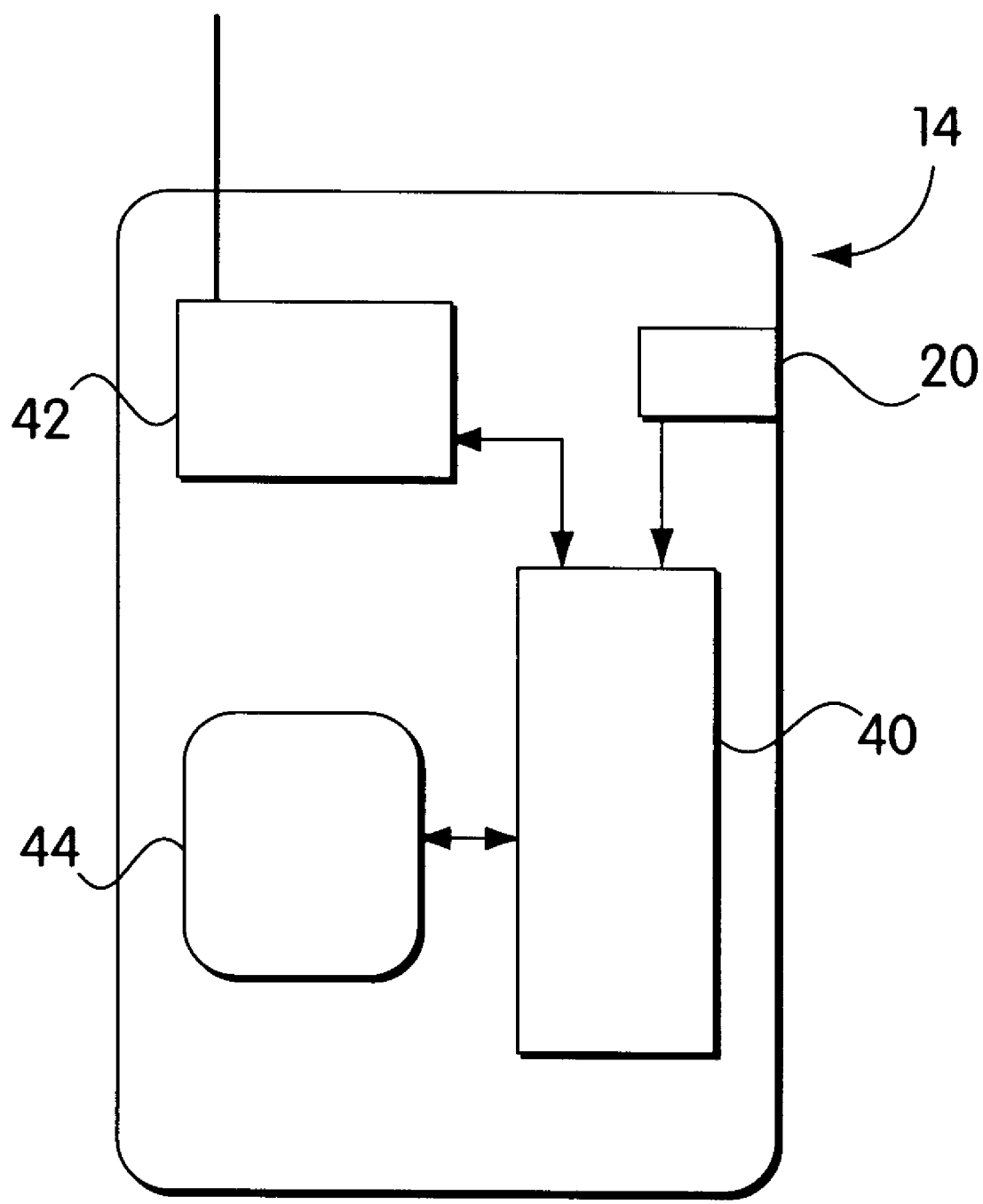
FIG. 2 depicts in more detail a wireless communication device suitable for practice with the system depicted in FIG. 1.

Turning now to FIG. 2, a more detailed description of the wireless communication device 14 can be seen. Specifically, as shown in FIG. 2, the wireless communication device 14 can include a processor 40, a wireless receiver/transmitter unit 42, and an I/O manager 44. It will be understood by those of ordinary skill in the art that although the above-described elements 40–44 are depicted as separate functional elements in FIG. 2, that in practice these elements can be combined into a single integrated component that can act to provide the functions of each of the functional blocks depicted in FIG. 2. The receiver 20 can receive data signals from the pen input device 12 and pass the data signals to the processor element 40. The processor element 40 can take the data signals and format them into a format suitable for delivery across a wireless network.

In one embodiment, the processor 40 acts to form the data signals into a set of data packets that can be delivered as IP protocol compliant data packets that can be delivered across a data network. In this way the processor 40 acts as data terminal equipment integrated into the GSM device. As is generally known, the GSM standard can support data transmission across the digital cellular network. In the typical arrangement a GSM, or mobile station, connects to a data terminal equipment device, such as a modem. A data connection can be established on a logical traffic channel from the GSM to a mobile exchange center (MSC) by means of the radio link between the GSM and the base station system. A network adaptor in the MSC can comprise a data modem. The line interface (modem interface) of the modem can be connected to a conventional 2-wire line, which can, in one example, connect through the public switched telephone network (PSTN) to a remote modem, which, in turn, can be connected to another remote terminal equipment comprising a remote modem and a data terminal DTE2 connected thereto. The data modem of the network terminating unit and the remote data modem signal in the normal manner over the modem connection established between them. The data terminal equipment controls the operation of the data modem over the GSM data connection, transmits data to the data modem, and correspondingly receives it. Normally, a transmission rate of 9600 bit/s is established.

The development of such devices for modulating data signals for transmission across a network is well known in the art, and commonly employed in PCMCIA based cellular modems, including those that employ the ComCellV90SCTM—High Speed Cellular Modem Chip, which is a V.90 Cellular Modem chip designed to meet the requirements of the Cellular PCMCIA card market. Such chip devices can be employed with the radio module and antenna assembly of the wireless device 14, and an EPROM, or other memory device for storing program instructions, that provide the wireless device with data transmission capabilities. Such a data transfer device can be incorporated into the wireless communications device. Alternatively, a separate component for processing data signals for transmission across the radio cellular network can be employed herewith, and these systems can couple to the wireless device 14 by any suitable means. Moreover, it will be understood that in alternative embodiments, the pen input device can include an encoder for formatting data signals into a format suitable for transfer over a network.

In still other embodiments, the data signals 20 generated by the pen input device 12 can be processed by the system 40 to generate tones suitable for being carried across a voice network and suitable for delivery as part of a facsimile transmission of data. Other techniques for allowing the wireless device 14 to support data transmissions can include those described in WO 93/02512 wherein a phone is described that includes functions for supporting data transmission, such as a radio unit, the RF frequencies thereof being those employed in the system, and an interface between the radio unit and other functions. Further techniques for transmitting data through a wireless communication device, as well as for coupling a wireless communication device to an input device, such as the pen input device, are set forth in U.S. Pat. No. 5,903,849.

In one practice, the processor 40 can also process the data signals generated by the pen input device 12 to create an image of the information traced by the pen input device. This image can be displayed to the user on the user screen 26 of the wireless communication device 14. The processing of such data signals can be accomplished by any suitable means, including those set forth in U.S. Pat. No. 5,903,849.

Figure 3:
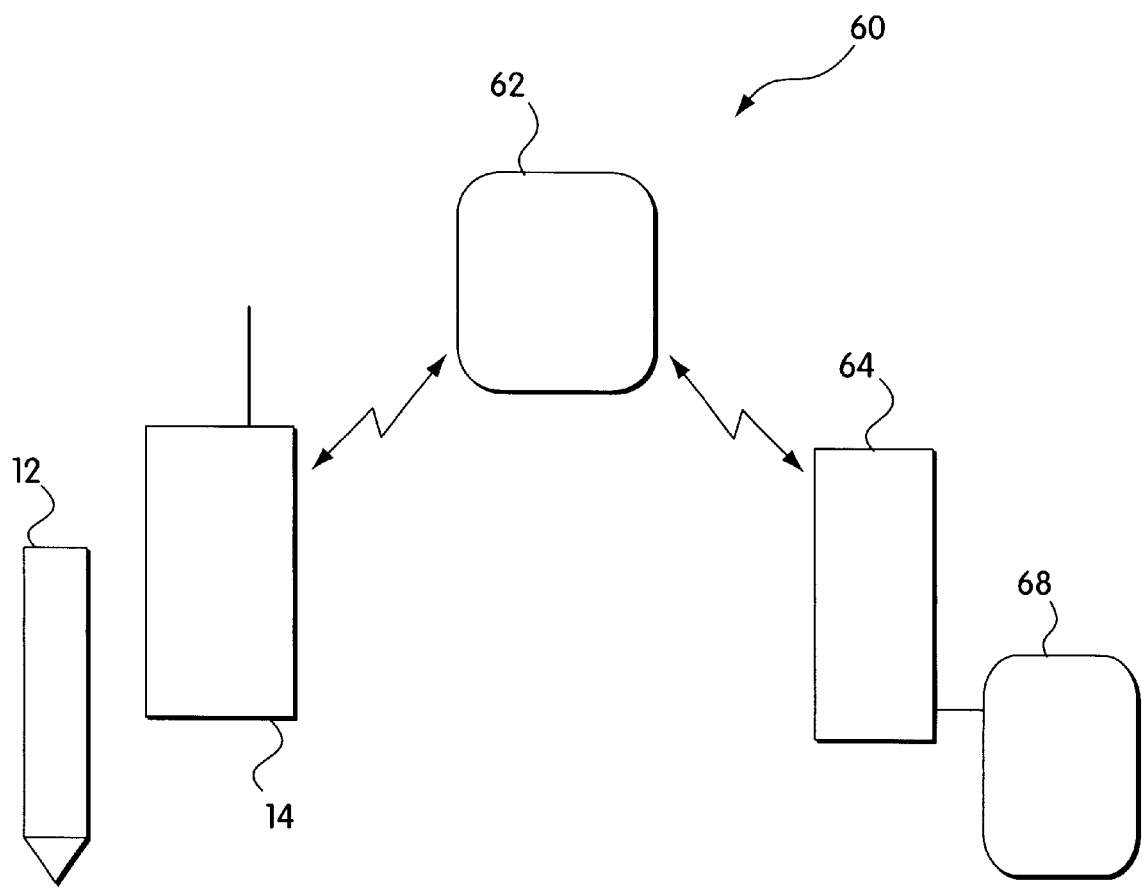
FIG. 3 depicts a data flow diagram for one system and process for transmitting signature data over a wireless network.

Turning now to FIG. 3, one practice for employing the systems described herein can be seen. Specifically, FIG. 3 depicts the pen input device 12 and the wireless device 14 being employed as part of a system 60 wherein a gateway 62 sits between the wireless communication device 14 and a server 64. The gateway 62 can be a wireless network to IP network gateway suitable for coupling the wireless communication device 14 to a package switched network such as the Internet. As further shown by FIG. 3, the server 64 can couple to the gateway 62 and to a database element 68. The server 64 can be a conventional server system, such as a SUN workstation running the Unix operating system and programmed to exchange IP data packets across the data network. The server 64 can further be programmed for selecting data packets transmitted from a wireless device, such as the device 14, wherein the data packets are understood to include data signals representative of a signature made by a user employing the wireless communication device 14. The server 64 can process the data signals to determine whether the signature offered by the user is authentic. To this end, the server 64 can access the database 68 wherein the database 68 stores templates previously provided by the user and representative of the characteristics, including dynamic and form characteristics of that user's signature. The server 68 can compare the data signals provided by the pen input device with the appropriate template stored in the database 68 and verify whether the data signals provided by the user are representative of an authentic signature. If the signature is deemed to be authentic, the server 64 can generate a verification signal representative of the verification of the signature. This verification signal can be formatted into a data packet or data packet set suitable for transmission to the gateway 62 and for further processing and transmission to the wireless communication device 14. The wireless communication device 14 can indicate to the user that the signature has been verified.

The system depicted in FIG. 3 can be employed in many different applications, including an application wherein a user wishing to employ the system 10 to perform a financial transaction, offers a signature to verify their identity, thereby allowing the server 64 to verify the identity of the user, and to determine whether the identified user is authorized to make the transaction requested.

Figure 4:
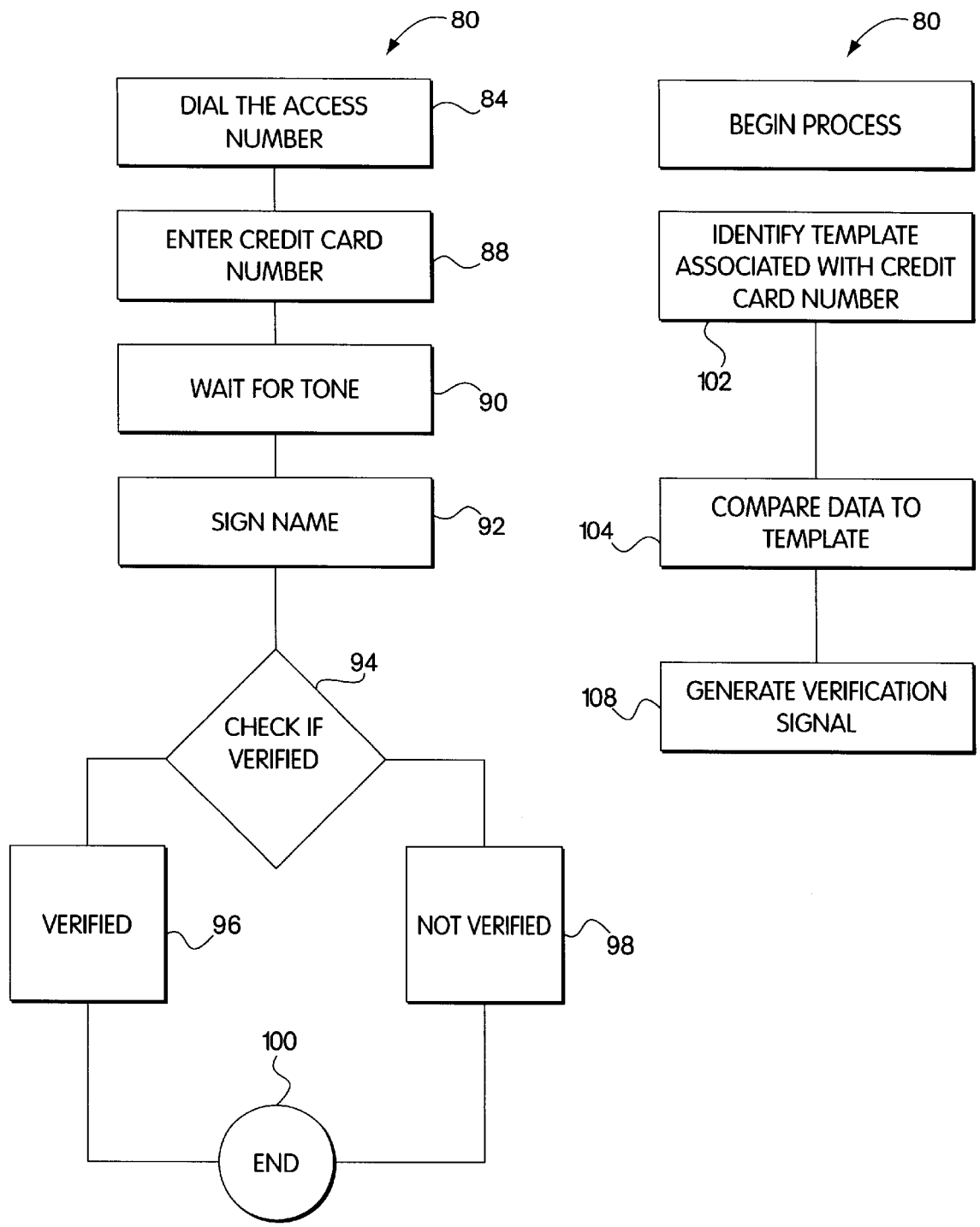
FIG. 4 depicts a flow chart diagram of a process for confirming the identify of a user at a remote location.

The process depicted in FIG. 3 is shown as a flowchart diagram in FIG. 4. Specifically, FIG. 4 depicts a process 80 and a process 82 wherein the process 80 can be performed by a user operating the pen input device 12 and wireless communication device 14, and the server 64 can implement the process 82 to respond to the actions of the user. As shown in FIG. 4, the process 80 can begin when the user dials the access number in step 84. The access number can be the phone number of the service that the user wishes to employ, such as a service that allows the user to use their credit card to make a purchase and verify that they are authorized to use the credit card for that purchase by offering their signature as a biometric measure of identity. After step 84 the process 80 proceeds to step 88 wherein the user can enter the credit card number. In response to step 88, if the process 82 can move to step 102 wherein the credit card number is employed for identifying the template within database 68 that corresponds to the reference signatures provided by the user at an earlier time. After step 88 the process 80 then proceeds to step 90 wherein the user waits for a tone. The tone can be generated by the server once the appropriate template has been identified. In response to the tone, the user can sign their name, as indicated by step 92, and the data generated thereby can be transferred to the server 64. In step 104, the server can compare the data provided by the user to the template identified in step 102. Once this comparison has been made, the process 82 can move to step 108 and generate a verification signal that indicates whether the data offered by the user corresponds closely enough to the template data. The verification signal can be provided to the user, where in step 94 the process 80 will check the status of the verification signal. If the verification signal indicates that the signature matches the template sufficiently, the process can move to step 96 wherein the user will know that the system has been verified. Alternatively, if an insufficient match occurred, the process can move to step 98 wherein the user can be signaled that no verification has been provided. In either case the process can proceed to step 100 and terminate. It will be noted that the verification signal generated in step 108 can also be employed for allowing or preventing the transaction sought by the user. For example, the verification signal can be employed for preventing the credit card number provided by the user to be authorized by the clearinghouse that controls access to the account associated with the credit card.

Figure 5:
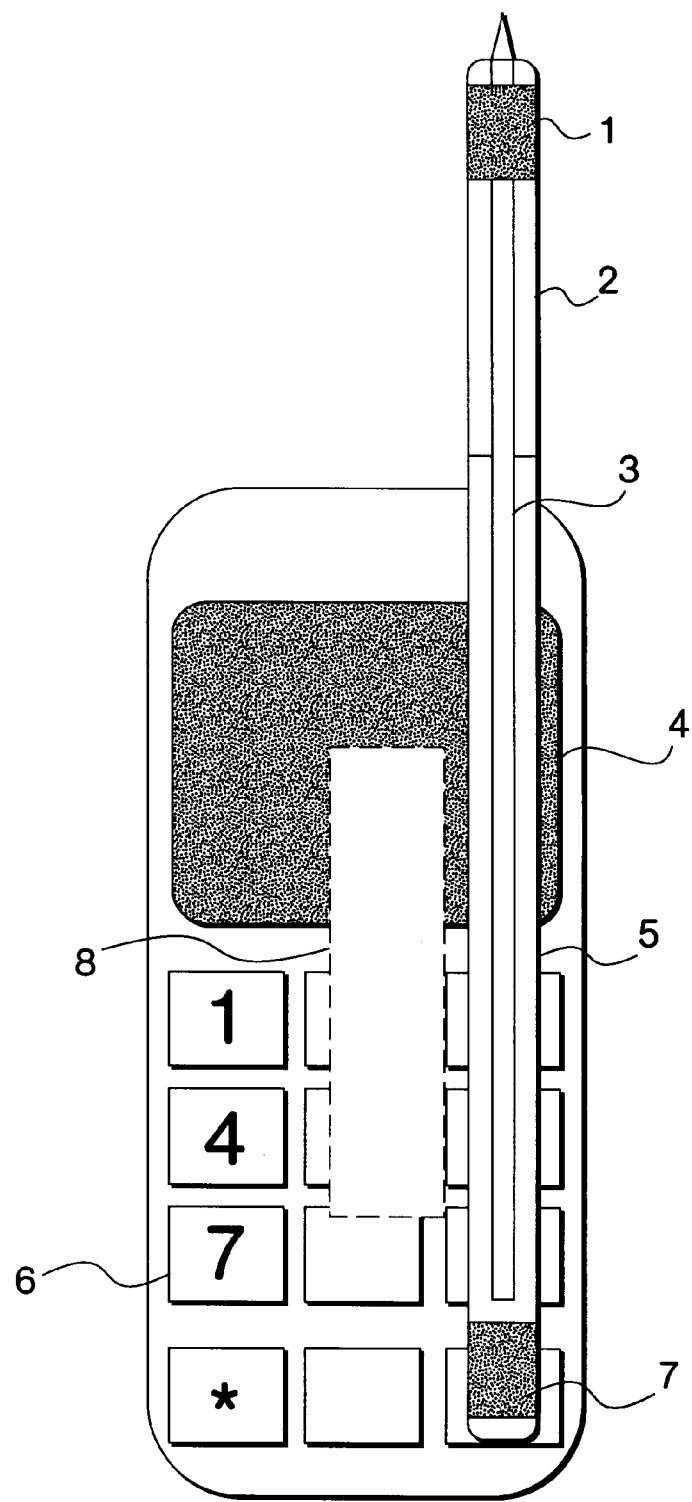
FIG. 5 depicts an embodiment wherein the housing of the wireless device includes a housing for the pen input device.

Turning to FIG. 5, a further embodiment of the invention can be seen. Specifically, FIG. 5 depicts a mobile telephone set or the display and which contains an electronic means for telephony and a micro electronic mechanical system control unit. The mobile telephone set also contains an antenna which is hollow and which can contain a pen cartridge to which can be attached a three dimensional force/acceleration/contact sensing device. The sensors attached to the pen cartridge can be controlled by the control unit. For the system depicted in FIG. 5, the pen input device can be stored in a compartment integrated into the housing of the mobile telephone set.

The systems and methods described above are merely illustrative of the types of systems and methods that can be provided by the invention. It will be understood by those of ordinary skill in the art that the systems and methods described herein can be modified for other applications and for other purposes. For example, the wireless communication device 14 can be a PDA, kiosk, laptop computer, ATM machine, or other such device. Moreover, the systems and methods described herein can be modified to include other functionality including character recognition wherein the data signals provided by the pen input device are processed by the processor of the wireless communication device to generate ASCII text to be displayed to the user on the screen or transmitted to a remote site. It will further be understood that these systems and methods described herein can be further employed for in-place verification of a user identity. Specifically, the telephone systems described herein can contain within the memory of those systems a template representative of a user signature. This onsite storage of such template information can be employed for allowing a user to verify their identity during a transaction. Other modifications can be made to the invention without departing from the scope thereof.

For example, the systems and methods described herein can be employed as devices for creating facsimile images that can be transmitted over the radio cellular network to an end point capable of decoding such facsimile transmissions, such as a fax machine, or a software device capable of reconstructing a facsimile image. Similarly, the systems and methods described herein can be employed as part of a small messaging system wherein messages can be generated and transferred as part of a protocol such as the SMS protocol that can deliver messages to pagers, cellular phones, personal digital assistance (PDA), or any other such devices.

Moreover, the systems and methods described herein can include wireless devices that are capable of reconstructing from the data signals provided by the pen input device 12, an image of the figures traced by the user on the writing surface. For example, in one embodiment the wireless communication device includes a screen display, such as the screen display 26 depicted in FIG. 1. The processor 40 depicted in FIG. 2 can be employed by the systems described herein for executing a program capable of processing the data signal and reconstructing therefrom an image of what the user traced on the working surface. In the embodiment, the user can verify that the image is as the user wishes before the data is transmitted over the radio cellular network. It will be apparent to one who is skilled in the art that the data terminal equipment like functionality of the system described herein can be employed in any of a number of applications including whiteboard applications, chat applications, web-based applications wherein the pen device can be employed for activating patrols on a web page, email applications, or any other suitable application.

Thus, it will be understood that the embodiments of the invention which have been described are illustrative of some of the applications and principles of the present invention. Various modifications may be those skilled in the art without departing from the spirit and scope of the invention

What is claimed is:

1. A system for transmitting signature data representative of a characteristic of a written signature over a wireless network, comprising
   an input device in the form of a pen, said pen including
      a sensor for measuring forces acting on a nib of the pen and generating a data signal representative of the characteristic of the written signature being traced on a writing surface, and
      a transmitter incorporated in the pen and transmitting said data signal to a remote receiver,
   a wireless communication device having the remote receiver receiving said data signal, and
   a remote verification processor receiving said data signal from the wireless communication device over a wireless communication channel of the wireless network,
   wherein the remote verification processor compares said data signal against a signature template for verifying whether said signature data representative of the characteristic of the written signature corresponds to said template.

2. A system according to claim 1, wherein said transmitter includes an infrared transmitter.

3. A system according to claim 1, wherein said transmitter includes a radio-frequency transmitter.

4. A system according to claim 1, wherein said transmitter includes a serial data generator.

5. A system according to claim 1, further including a data packet generator for formatting said data signal into a data packet conforming to a preselected data transfer protocol.

6. A system according to claim 1, further comprising a data screen for displaying an image representative of information carried in said data signal.

7. A system according to claim 1, wherein said wireless communication device includes a mobile telephone.

8. A system according to claim 1, wherein said wireless communication device includes a PDA having a wireless communication device.

9. A system according to claim 1, wherein said wireless communication device includes a wireless modem.

10. A system according to claim 1, wherein said wireless communication device includes a controller for processing said data signal generated by said pen input device to generate an image signal representative of an image traced by said pen on a writing surface.

11. A system according to claim 1, further comprising a processor for formatting said data signal into a format suitable for transmission as a facsimile transmission.

12. A method for verifying the identity of a user at a remote location based on signature data representative of a dynamic characteristics of a written signature of the user, comprising provinding an input device in the form of a pen, with a sensor capable of measuring forces acting on a nib of the pen and generating a data signal representative of the dynamic characteristics of the written signature been traced on a writing surface, the pen further including a transmitter for transmitting said data signal to a remote receiver, providing a wireless communication device having a the remote receiver receiving said data signal, the wireless communication device transmitting said data signal over a communication channel, directing a user to operate said pen on the writing surface to trace the written signature associated with the user, capturing the signature data representative of said dynamic characteristics of the written signature, and the wireless communication device transmitting said signature data to a remote verification processor for processing said signature data representative of said dynamic characteristics of the written signature to verify the identity of said user.

13. A system for transmitting signature data representative of dynamic characteristics of a written signature over a wireless network, comprising an input device in the form of a pen, said pen including
 a sensor for measuring forces acting on a nib of the pen and generating a data signal representative of the dynamic characteristics of the written signature being traced on a writing surface, and
 a transmitter incorporated in the pen and transmitting said data signal to a remote receiver, a wireless communication device having the remote receiver receiving said data signal, and a remote verification processor receiving said data signal from the wireless communication device over a wireless communication channel of the wireless network, wherein the remote verification processor compares said data signal against a signature template for verifying whether said signature data representative of the dynamic characteristics of the written signature corresponds to said template.

* * * * *